(No Model.)
A. E. HOTCHKISS.
PINION FOR CLOCKS AND WATCHES.
No. 248,557.   Patented Oct. 18, 1881.
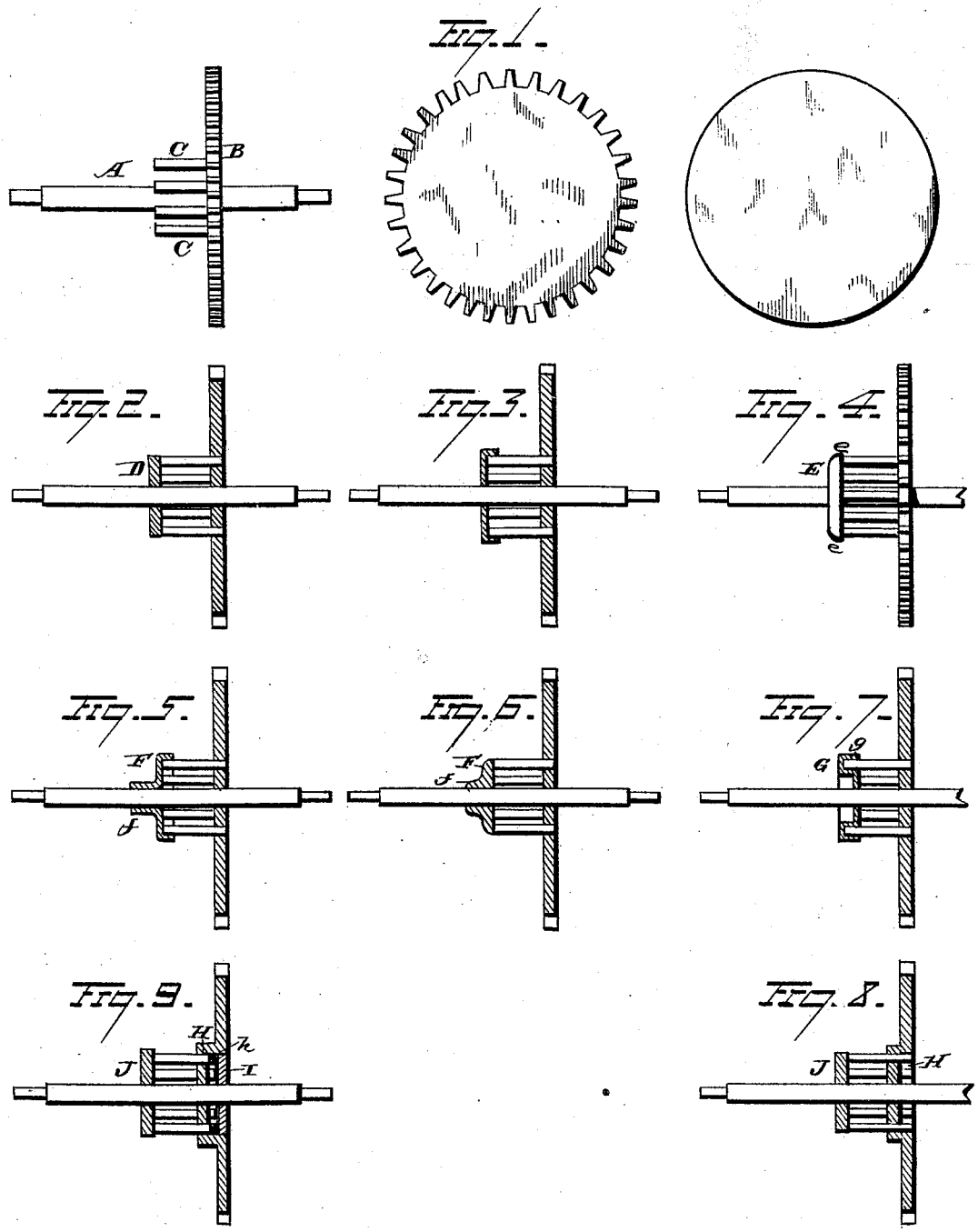
WITNESSES
INVENTOR
Arthur E. Hotchkiss
By H. A. Seymour,
ATTORNEY

UNITED STATES PATENT OFFICE.

ARTHUR E. HOTCHKISS, OF CHESHIRE, CONNECTICUT.

PINION FOR CLOCKS AND WATCHES.

SPECIFICATION forming part of Letters Patent No. 248,557, dated October 18, 1881.

Application filed January 21, 1881. (No model.)

*To all whom it may concern:*

Be it known that I, ARTHUR E. HOTCHKISS, of Cheshire, in the county of New Haven and State of Connecticut, have invented certain new and useful Improvements in Pinions for Clocks or Watches; and I do hereby declare the following to be a full, clear, and exact description of the invention, such as will enable others skilled in the art to which it pertains to make and use it, reference being had to the accompanying drawings, which form part of this specification.

My invention relates to an improvement in pinions for clocks, watches, or other instruments or devices.

Heretofore lantern-pinions have been constructed in the following manner: Two brass collets are first driven onto a shaft and the shaft then placed in a turning-lathe and the collets turned and pivots formed on opposite ends of the shaft. Holes are then drilled in the collets for the reception of the pinion-leaves, which latter are inserted in place in the collets, and the latter upset around the ends of the leaves to prevent the latter from becoming displaced. When the wheel is to be secured directly to the pinion a shoulder is turned on one of the collets thereof and the wheel is staked on the shouldered end of the collet by a prick-punch.

Pinions made in the manner described are of undue cost in manufacture owing to the fact that delicate and costly machinery, as well as high-priced labor, is required to drill the collets and fit the pinions. In staking the wheels onto the collets the wheels are drawn out of true in two directions—namely, axially and laterally—and hence require to be trued up before they can be used. This particular work calls for a high grade of skill, and consequently high-priced labor, all of which materially adds to the cost of such pinions.

The object of my invention is to provide pinions of such construction that they shall be durable and efficient in use, finished and tasty in appearance, and adapted to be manufactured at a small initial cost; and with these ends in view my invention consists, essentially, in a pinion having its leaves secured at one end by solder or equivalent material, and a disk or washer forced against the outer and unsupported end of the leaves.

My invention further consists in certain details in construction and arrangement of parts, as will hereinafter be described, and pointed out in the claims.

In the accompanying drawings, Figure 1 is a view, in side elevation, of the pinion before the washer or disk is applied thereto. Fig. 2 is a similar view, illustrating a solid disk forced against the outer and unsupported ends of the pinion-leaves. Figs. 3, 4, 5, 6, 7, 8, 9 are modifications.

A represents the pinion-shaft; B, the wheel, and C the pinion-leaves, the latter being inserted in holes formed in wheel B and secured thereto, and also the wheel to the shaft by means of solder. There are many ways and different kinds of machinery that may be resorted to for manufacturing the style of pinions illustrated in Fig. 1, as has been fully set forth in another application filed of even date herewith.

D is a disk, of brass or other material, driven onto the pinion-shaft A and forced up snugly against the unsupported ends of the pinion-leaves C. This disk D adds to the strength of the pinion, as it prevents the endwise displacement of the leaves should any be insecure, owing to defective soldering, and also it assists in retaining the leaves parallel to the shaft and equidistant from each other, as the flat ends of the pinion-leaves, resting in direct contact with the inner face of the disk, are to a considerable extent held against displacement by their frictional engagement therewith. The disk also serves another important function, in that it adds very materially to the appearance and finish of the pinions.

While the pinions without the disk are a valuable improvement, and clocks having such pinions employed therein can be supplied to the trade at a much less cost than such as are furnished with the ordinary construction of lantern-pinions, yet it is desirable to furnish not only a cheap and durable pinion, but one having a high finish and tasty appearance, and this effect is produced by the application of the disk or washer to the ends of the pinion-leaves.

Fig. 3 is a view in side elevation of a pinion having a cup-shaped disk forced onto the ends of the leaves, the disk being shown in vertical section.

Fig. 4 represents such construction of pinion in side elevation. The cup-shaped washer or disk E has a flange, e, which extends over the ends of the pinion leaves, thereby confining them in position. The frictional engagement of the pinion-leaves at their ends and sides with the end and flange of the cup-shaped disk or washer assists very materially in preventing any lateral, longitudinal, or axial displacement of said leaves. As the cup-shaped washer or disk may be struck up of very light stock it may be made a very light expense and add but slightly to the cost of the pinion.

In Figs. 5 and 6 I have represented another modification, the same consisting in a cup-shaped washer or disk, F, to be forced against and over the ends of the pinion-leaves. The central portion of the cup-shaped disk or washer is provided with a burr or sleeve, $f$, formed in punching or in any desired manner, which snugly fits upon the pinion-shaft. The burr or tubular bearing $f$ on the washer insures an extended bearing on the shaft, thereby enabling the disk or washer to be made of very thin metal and yet secured tightly to the pinion-shaft.

Fig. 7 is another form of construction, showing a washer or disk, G, provided with an annular groove, $g$, near its outer edge, in which are received the ends of the pinion-leaves, and by means of which the leaves are prevented from being forced either toward or away from the pinion-shaft. The central portion of the washer or disk is provided with a sleeve or tubular bearing, $g'$, which snugly fits the pinion-shaft.

Figs. 8 and 9 represent another form of construction, wherein the wheel has a cup-shaped recess, H, formed therein, which may be done by stamping. The leaves are then inserted in the recessed portion H of the wheel and secured by solder or equivalent material applied to the ends of the leaves. As the leaves have an extended bearing in the flange $h$ constituting the side of the recessed portion, and are firmly secured thereto, the pinion will be strong and durable as well as tasty and finished in appearance. The recessed portion H of the wheel has the appearance of being a solid collet, as shown in Fig. 9. A disk, I, is then forced into the recess and serves to conceal the ends of the pinion-leaves. A disk, J, is forced against the outer ends of the pinion-leaves.

In order to clearly set forth and describe my invention I have been obliged to refer to pinions having their leaves secured at one end by solder; but I make no broad claim in this application to such construction of pinion, as it is described and claimed in another application.

From the foregoing it is clear that my invention may be embodied in many different forms of construction, and hence I would have it understood that I do not restrict myself to the exact construction and arrangement of parts shown and described; but, Having fully described my invention, what I claim as new, and desire to secure by Letters Patent, is—

1. A pinion having its leaves secured at one end by solder and a washer or disk forced against the opposite ends of the leaves, substantially as set forth.

2. A pinion having its leaves secured to a wheel or collet at one end by solder and a washer placed over and arranged to conceal said soldered ends, substantially as set forth.

In testimony that I claim the foregoing I have hereunto set my hand this 14th day of September, 1880.

ARTHUR E. HOTCHKISS.

Witnesses:
A. W. BRIGHT,
A. L. LAWRENCE.